(12) United States Patent
Blevins et al.

(10) Patent No.: US 6,546,715 B1
(45) Date of Patent: Apr. 15, 2003

(54) CASCADE-TYPE THRUST REVERSER

(75) Inventors: Robert D. Blevins, San Diego, CA (US); Michael R. Aten, San Diego, CA (US); Jihad I. Ramlaoui, Oceanside, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/769,828

(22) Filed: Jan. 25, 2001

(51) Int. Cl.[7] .................................................. F02K 3/02
(52) U.S. Cl. ..................... 60/226.2; 60/230; 244/110 B; 239/265.29
(58) Field of Search ............................. 60/226.2, 230; 244/110 B; 239/265.29, 265.31, 265.25, 265.27

(56) References Cited

U.S. PATENT DOCUMENTS

| | | | | |
|---|---|---|---|---|
| 2,945,346 A | * | 7/1960 | Arnzen ................... | 239/265.29 |
| 2,955,417 A | * | 10/1960 | Brown ................... | 239/265.27 |
| 3,500,645 A | | 3/1970 | Hom ........................... | 60/229 |
| 3,599,432 A | * | 8/1971 | Ellis ........................... | 60/226.2 |
| 3,734,411 A | * | 5/1973 | Wolf et al. ............ | 239/265.29 |
| 3,779,010 A | * | 12/1973 | Chamay et al. ............. | 60/226.2 |
| 4,232,516 A | * | 11/1980 | Lewis et al. ................ | 60/226.2 |
| 4,731,991 A | * | 3/1988 | Newton ....................... | 60/226.2 |
| 4,807,434 A | * | 2/1989 | Jurich et al. ................ | 60/226.2 |
| 6,000,216 A | | 12/1999 | Vauchel ...................... | 60/226.2 |
| 6,101,807 A | | 8/2000 | Gonidec et al. ........... | 60/226.2 |

FOREIGN PATENT DOCUMENTS

EP 0109219 5/1984

* cited by examiner

*Primary Examiner*—Ted Kim
(74) *Attorney, Agent, or Firm*—Baker Botts L.L.P.

(57) ABSTRACT

A thrust reverser for a turbofan engine having an air duct defined radially inwardly by a cowl around a gas turbine and radially outwardly in part by a fan case of the engine includes a bulkhead that is adapted to be mounted on the fan case. A translating sleeve is supported for movement axially between a closed position adjacent the bulkhead and an open position spaced apart axially to the rear of the bulkhead so as to form a outlet opening for discharge of air from the air duct. A cascade array fixed in the outlet opening has a substantially conical portion, the forward end of which is of a diameter substantially smaller than the diameter of the rearward end.

5 Claims, 4 Drawing Sheets

CASCADE-TYPE THRUST REVERSER

BACKGROUND OF THE INVENTION

The present invention relates to thrust reversers for turbofan engines and, in particular, to thrust reversers of the type having a cascade array affixed in the outlet opening from the engine air duct for redirecting the air flow in the duct outwardly and forwardly when the thrust reverser is deployed.

One general type of thrust reverser for the air duct of turbofan engines is based on a translating sleeve that forms a rearward, outer wall portion of the air duct. For normal rearward air flow through the air duct, the translating sleeve resides in a closed position in which its forward end engages a bulkhead that is mounted on the fan case of the engine via a V-groove/V-blade interface. For reverse air flow, the translating sleeve is moved rearwardly away from the bulkhead, leaving an outlet opening rearwardly of the bulkhead through which air is discharged from the air duct. The thrust reverser also provides for blocking of the air duct at a location rearwardly of the outlet opening.

In one form of blocking system, a number of blocking doors are pivotally mounted on the translating sleeve and coupled by linkages to the cowl of the air turbine of the engine. When the translating sleeve moves rearwardly upon deployment of the thrust reverser, the linkages pivot the blocking doors radially inwardly to positions in which they block the air duct. Another form of blocking system is a fixed inner wall member on the translating sleeve that is located and shaped to form the outer wall of the portion of the duct inwardly of the thrust reverser outlet opening when the translating sleeve is in the forward position and to block the air duct when the translating sleeve is the rearward, reverse-thrust position.

When the translating sleeve is deployed for reverse thrust of the air flow produced by the engine fan, a cascade array, a series of fixed, circumferentially extending, curved deflector blades, located in the outlet opening formed between the bulkhead and the translating sleeve redirects the air flow in the air duct so that it flows through the cascades outwardly and forwardly. Previously known cascade arrays for thrust reversers have had a circular cylindrical arrangement. Circular cylindrical cascade arrays use the available space efficiently and are conducive to structural integration with the top and bottom slide track beams of the thrust reverser. Examples of thrust reversers of the cascade array type for the air ducts of turbofan engines are described and shown in, for example, U.S. Pat. Nos. 3,500,645 and 6,000,216, and in EP 0 109 219.

SUMMARY OF THE INVENTION

An object of the present invention is to provide a thrust reverser having a cascade array that provides for more effective use of the entire length of the cascade array in redirecting the air flow, thus permitting an increase in thrust reverser efficiency for any given size of cascade array and air flow in the air duct or allowing the size and weight of the cascade array to be reduced for any given reverse thrust and air flow. In the latter case, the required travel of the translating sleeve can also be reduced, thus yielding additional savings in weight. Furthermore, shorter cascades allow for optimized aerodynamic sleeve external lines, thus reducing drag. Another object is to provide a thrust reverser in which a cascade array is structurally incorporated in a manner that is likely to permit reductions in the size and weight of some of the structural components of the thrust reverser.

The foregoing objects are attained, in accordance with the present invention, by a thrust reverser for a turbofan engine having an air duct defined radially inwardly by a cowl around a gas turbine and radially outwardly in part by a fan case of the engine. The thrust reverser includes a bulkhead that is adapted to be mounted on the fan case. A translating sleeve is supported for movement axially between a closed position adjacent the bulkhead and an open position spaced apart axially to the rear of the bulkhead so as to form an outlet opening for discharge of air from the air duct. A cascade array fixed in the outlet opening has a substantially conical portion, the forward end of which is of a diameter substantially smaller than the diameter of the rearward end.

The conical portion of the cascade array permits the forward cells of the cascade array to be located closer to the air flow in the duct than in conventional cylindrical cascade arrays, thus enabling an increased air flow through the forward cells and improving efficiency. The conical portion of the cascade array also permits the forward end to be affixed to the forward bulkhead of the thrust reverser at a location radially inwardly of the outer perimeter, thus reducing the torque load on the bulkhead and permitting it to be made smaller and lighter.

The conical portion of the cascade array does not have to be a true cone and may have a curvature in the axial direction while still preserving the advantages derived from having the forward end closer to the air flow for more effective use of the cells of the entire array, especially those near the forward end.

The cascade array may be substantially conical throughout its axial extent and arranged in line or close to in line with the outer V-groove of the fan case. Loads transferred from the cascade array to the bulkhead act generally in line with the V-groove, thus minimizing torque loads exerted by the cascade array on the bulkhead. The bulkhead can be smaller and lighter than those of previously known cascade type thrust reversers.

The cascade array of the present invention can be used with particularly important advantages in a thrust reverser in which the translating sleeve has a generally conical inner wall member forming a portion of outer wall of the duct when the translating sleeve is in the closed position and forming a blocking wall for closing the duct to rearward air flow when the translating sleeve is in the open position. The absence of pivoting doors for closing the air duct and the linkages and brackets associated with such doors allows the cascade array to be located very close to the air flow path in the duct, especially in the upstream area of the outlet opening near the bulkhead.

For a better understanding of the invention, reference may be made to the following description of exemplary embodiments of the present invention, taken in conjunction with the accompanying drawings.

DESCRIPTION OF THE EMBODIMENT

Figure 1:
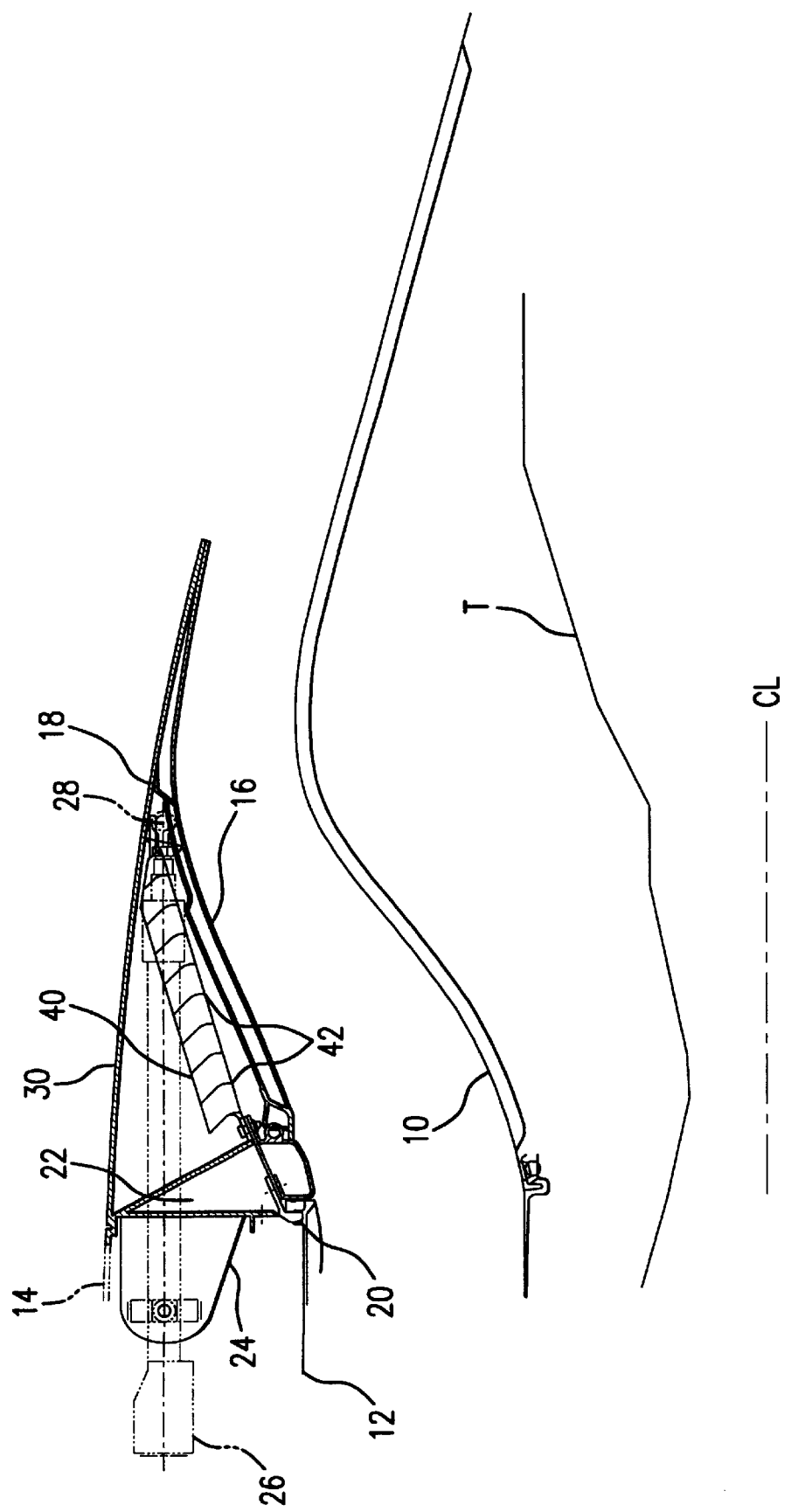
FIG. 1 is a schematic side cross-sectional view of a portion of a turbofan engine having a first embodiment of the cascade-type thrust reverser according to the invention, the section being taken along a plane through the axis and the translating sleeve being shown in the closed position.

The annular air duct of the turbofan engine is formed inwardly by the cowl 10 of the engine gas turbine (shown schematically at T) and outwardly in part by a portion of the fan case 12 and in part in the closed position of the thrust reverser by a fixed inner wall member 16 of a translating sleeve 18. An outer V-groove 20 at the rearward end of the fan case 12 provides a mount for a torque box/forward bulkhead 22 of the thrust reverser assembly. The space between the fan case 12 and the rearward part of a fan case cowling 14 contains the mounting bracket 24 and the front part of each of four (or more) linear actuators 26, which are spaced apart circumferentially around the fan case 12 of the engine. The output end of each actuator 26 is attached by a coupling 28 to the translating sleeve 18. The translating sleeve 18 has an outer wall member 30 that is faired to the fan case cowling 14 when the translating sleeve is in the closed position (FIG. 1). As is well-known to those skilled in the art, the translating sleeve is made in two units, each of generally C-shape in front (and rear) elevation, which are supported for sliding on upper and lower track beams (not shown) that extend rearwardly from the bulkhead 22.

Figure 2:
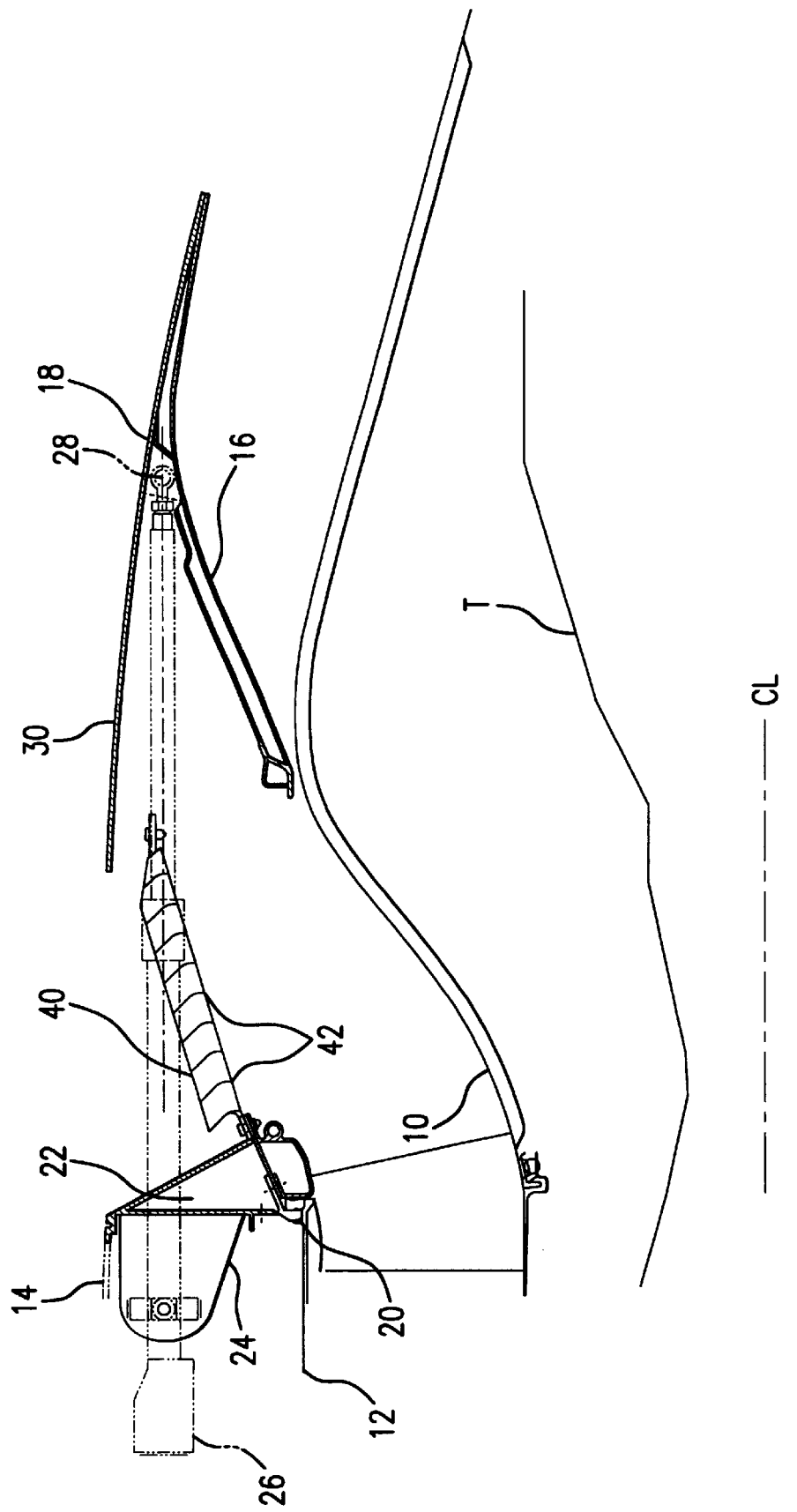
FIG. 2 is a view corresponding to that of FIG. 1 but shows the translating sleeve in the open position.

Upon command by the pilot, the actuators 26 drive the translating sleeve 18 rearwardly to the position shown in FIG. 2. The inner wall member 16 of the translating sleeve 18 moves to a location that places its inner, forward edge close to the cowl 10 of the gas turbine, a position in which air flow to the rear of the air duct is blocked. The outer wall member 30 moves with the inner wall member 16 away from the fan case cowling 14, thus forming an opening rearwardly of the bulkhead 22 between the air duct and the exterior of the engine. The air flow through the duct flows out through the opening. A cascade array 40, which is composed of several sections having frames that support curved vanes 42, turns the air flow so that it flows outwardly and forwardly.

The cascade array 40 in the embodiment of FIGS. 1 and 2 is conical throughout its lengthwise extent. The forward end has a diameter significantly smaller than that of the rearward end. The conical configuration has a number of advantages, including:

1) The cells of the array, especially those near the front, are placed closer to the air duct, which increases the efficiency of the array as compared with the conventional cylindrical array. For any given air flow, the conical array may be made shorter than a cylindrical array for a given reverse thrust, or a greater thrust may be produced by an array of a length comparable to that of a conventional cylindrical array.

2) The conical shape of the cascade array permits the forward end to be attached to the bulkhead 22 at a radially inward location, thus providing a load path that is in line with or close to being in line with the V-groove 20 of the fan case 12. The reduced load on the bulkhead 22 should permit the bulkhead to be made smaller and lighter.

3) The conical shape is inherently strong and rigid. If the sections are interconnected circumferentially to one another and the track beams, it should be possible to omit a rear cascade attach ring and also to further reduce the size and weight of the bulkhead.

Figure 3:
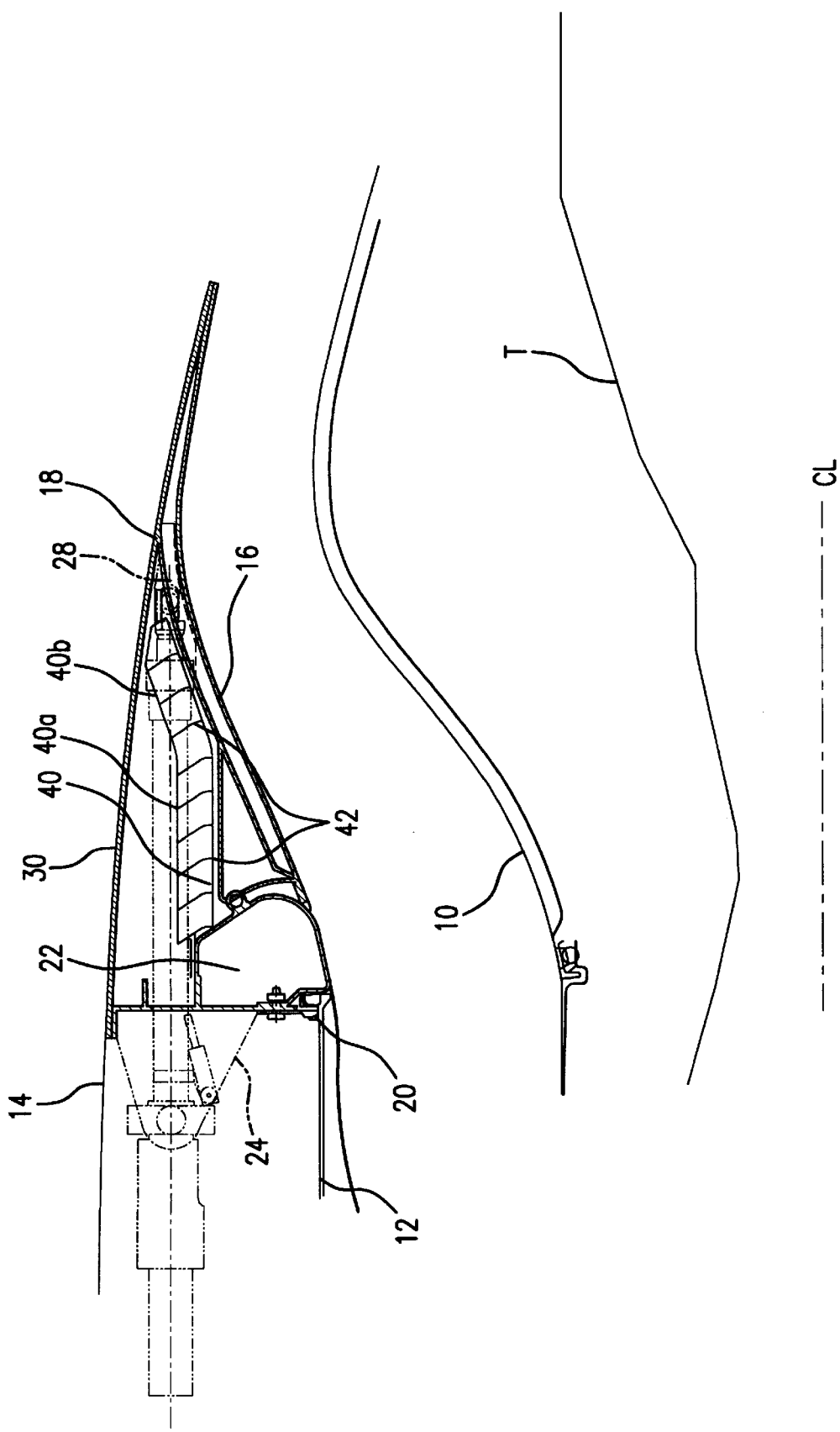
FIG. 3 is a schematic side cross-sectional view of a portion of a turbofan engine having a second embodiment of the cascade-type thrust reverser according to the invention, the section being taken along a plane through the axis and the translating sleeve being shown in the closed position.
Figure 4:
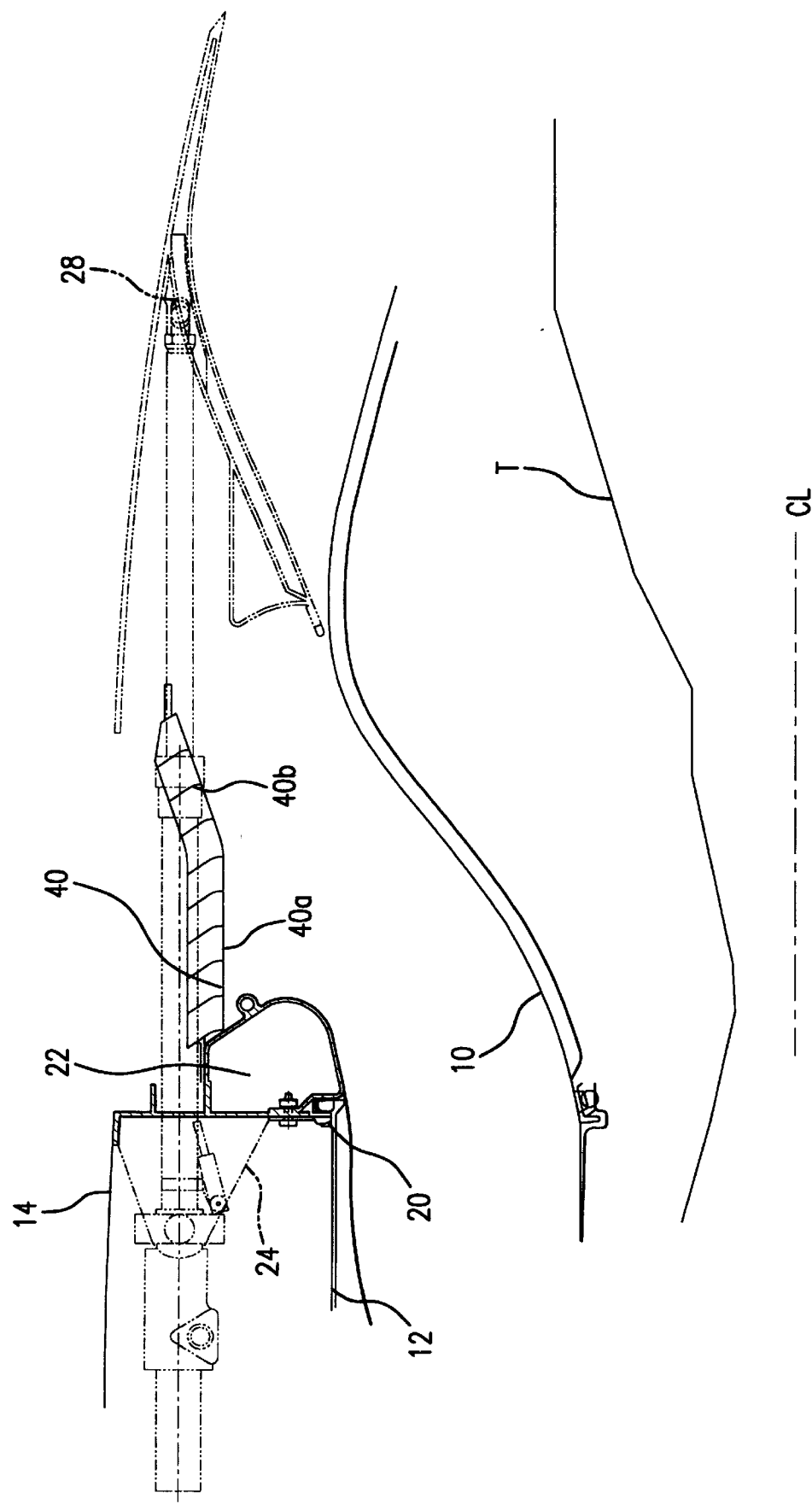
FIG. 4 is a view corresponding to that of FIG. 3 but shows the translating sleeve in the open position.

The embodiment of FIGS. 3 and 4 is the same as that of the embodiment of FIGS. 1 and 2 except for the configuration of the cascade array 40 and the details of the inner wall member 16 of the translating sleeve and the bulkhead 22. The cascade array 40 of the second embodiment has a cylindrical portion 40a at the forward end and a conical portion 40b at the rearward end. Like the first embodiment, the blades 42 near the forward end are brought closer to the fan air duct, which allows them to receive a greater air flow than in the conventional entirely cylindrical arrangement. Also, the forward end of the cascade array 40 is attached to the bulkhead 22 at a location radially inwardly from the outer perimeter, which is structurally advantageous and allows the bulkhead to be smaller and of lower weight.

A variation of the second embodiment is to have a cylindrical portion at the rearward end and a conical portion at the forward end. In another configuration, there can be conical portions at the front and rear and a cylindrical portion between the conical portions.

A cascade array of partly or entirely conical shape can be used in translating sleeve-type thrust reversers of other designs, such as those having pivotal blocker doors on the translating sleeve. The cone angle of a fully-conical cascade array or the conical portion(s) of a partly conical cascade array can, of course, vary, depending on, for example, the available space. Also, as mentioned above, a conical portion (s) of a cascade array or a fully conical cascade array need not be a true cone and may have a curvature in the axial direction.

What is claimed is:

1. A thrust reverser for a turbofan engine having an air duct defined radially inwardly by a cowl around a gas turbine and radially outwardly in part by a fan case of the engine, comprising
    a bulkhead adapted to be mounted on the fan case,
    a translating sleeve supported for movement axially between a closed position adjacent the bulkhead and an open position spaced apart axially to the rear of the bulkhead so as to form an outlet opening for discharge of air from the air duct, and
    a cascade array fixed in the outlet opening, the cascade array attached to the bulkhead at a location substantially inwardly of the outer perimeter of the bulkhead, the cascade array having a substantially conical portion, wherein the forward end of the conical portion has a diameter substantially smaller than the diameter of the rearward end, and the cascade array being substantially conical throughout its axial extent.

2. The thrust reverser according to claim 1, wherein the translating sleeve has a fixed generally conical inner wall member forming a portion of the outer wall of the duct when the translating sleeve is in the closed position and forming a blocking wall for closing the duct to rearward air flow when the translating sleeve is in the open position.

3. The thrust reverser according to claim 2, wherein the fan case has an outer V-groove and the cascade array is substantially in line with the outer V-groove.

4. A thrust reverser for a turbofan engine having an air duct defined radially inwardly by a cowl around a gas turbine and radially outwardly in part by a fan case of the engine, comprising
    a bulkhead adapted to be mounted on the fan case,
    a translating sleeve supported for movement axially between a closed position adjacent the bulkhead and an open position spaced apart axially to the rear of the bulkhead so as to form an outlet opening for discharge of air from the air duct, and a cascade array fixed in the outlet opening, the cascade array having a substantially conical portion, wherein the forward end of the conical portion has a diameter substantially smaller than the diameter of the rearward end, the cascade array being substantially conical throughout its axial extent, and the fan case has an outer V-groove and the cascade array is substantially in line with the outer V-groove.

5. The thrust reverser according to claim 4, wherein the translating sleeve has a fixed generally conical inner wall member forming a portion of the outer wall of the duct when the translating sleeve is in the closed position and forming a blocking wall for closing the duct to rearward air flow when the translating sleeve is in the open position.

\* \* \* \* \*